(12) United States Patent
Park

(10) Patent No.: US 11,380,926 B2
(45) Date of Patent: Jul. 5, 2022

(54) FUEL CELL HAVING CORRUGATED MEMBRANE ELECTRODE ASSEMBLY

(71) Applicant: Jonghyun Park, Rolla, MO (US)

(72) Inventor: Jonghyun Park, Rolla, MO (US)

(73) Assignee: THE CURATORS OF THE UNIVERSITY OF MISSOURI, Columbia, MO (US)

(*) Notice: Subject to any disclaimer, the term of this patent is extended or adjusted under 35 U.S.C. 154(b) by 0 days.

(21) Appl. No.: 16/993,397

(22) Filed: Aug. 14, 2020

(65) Prior Publication Data

US 2021/0050612 A1 Feb. 18, 2021

Related U.S. Application Data

(60) Provisional application No. 62/886,538, filed on Aug. 14, 2019.

(51) Int. Cl.
| | |
|---|---|
| H01M 8/1006 | (2016.01) |
| H01M 4/88 | (2006.01) |
| H01M 8/0263 | (2016.01) |
| D01D 5/00 | (2006.01) |

(52) U.S. Cl.
CPC ........ *H01M 8/1006* (2013.01); *D01D 5/0007* (2013.01); *H01M 4/8807* (2013.01); *H01M 8/0263* (2013.01)

(58) Field of Classification Search
CPC .................................................. H01M 8/1006
See application file for complete search history.

(56) References Cited

U.S. PATENT DOCUMENTS

| | | | | |
|---|---|---|---|---|
| 2002/0012825 A1* | 1/2002 | Sasahara | ............. | H01M 8/0289 429/482 |
| 2004/0038102 A1* | 2/2004 | Beckmann | .......... | H01M 8/0297 429/457 |
| 2008/0063915 A1* | 3/2008 | Yamamoto | ............ | H01M 4/926 429/483 |
| 2013/0244131 A1* | 9/2013 | Arcella | ............... | H01M 8/0254 429/480 |
| 2016/0072145 A1* | 3/2016 | Martinchek | ......... | H01M 8/2404 429/457 |
| 2018/0342756 A1* | 11/2018 | Song | ................... | H01M 50/461 |

FOREIGN PATENT DOCUMENTS

| | | | | |
|---|---|---|---|---|
| DE | 102009003074 A1 * | 11/2010 | ............ | H01M 8/243 |
| FR | 0309071 A1 * | 1/2005 | .............. | H01M 8/04 |

* cited by examiner

*Primary Examiner* — Brian R Ohara
(74) *Attorney, Agent, or Firm* — Stinson LLP

(57) ABSTRACT

An electrochemical reaction cell comprising an anode electrode, a cathode electrode, and a membrane electrode assembly (MEA). The MEA is positioned between the anode electrode and the cathode electrode. The anode electrode, the cathode electrode, and the MEA each have a corrugated shape and are contained within a recess of a housing.

16 Claims, 6 Drawing Sheets

FUEL CELL HAVING CORRUGATED MEMBRANE ELECTRODE ASSEMBLY

CROSS-REFERENCE TO RELATED APPLICATION

The present application claims the benefit of U.S. Provisional Application No. 62/886,538, filed Aug. 14, 2019, the entire disclosure of which is incorporated herein by reference.

BACKGROUND

Aspects of the present disclosure relate generally to fuel cell technology and particularly to a direct ethanol fuel cell and membrane electrode assembly for improving fuel cell system performance.

A fuel cell converts chemical energy generated from oxidation of hydrogen into electric energy. In operation, the cell processes a hydrocarbon fuel source to produce the hydrogen. Liquid hydrocarbon fuel sources offer high energy densities and the ability to be readily stored and transported. Because fuel cells have a higher efficiency compared to other internal combustion engines, and are substantially free from emission of pollutants, they have become the focus of attention as an alternative energy technology.

Direct ethanol fuel cells (DEFCs) are a promising carbon-neutral and sustainable power source for portable, mobile, and stationary applications. In general, a conventional DEFC comprises an anode, a cathode and an electrolyte. The DEFC includes first and second housing sections, or end plates, assembled together via a plurality of mechanical fasteners, such as bolts. An anode fuel inlet supplies hydrogen fuel to one electrode (the anode) where it is oxidized to release electrons to the anode and hydrogen ions to an electrolyte. A cathode fuel inlet supplies oxidant (typically air or oxygen) to the other electrode (the cathode) where electrons from the cathode combine with the oxygen and the hydrogen ions in the electrolyte to produce water.

In the conventional fuel cell, the housing contains flat flow field channel blocks or plates designed to provide an adequate amount of a reactant (hydrogen or oxygen) to a flat membrane electrode assembly (MEA) sandwiched between the plates. Each MEA in a stack is sandwiched between two plates to separate it from neighboring cells. The flow field plates, also referred to as bipolar plates, are typically formed of metal, graphite, or a carbon composite to permit good transfer of electrons between the anode and the cathode. In addition, the plates provide electrical conduction between cells via associated current collectors and provide physical strength to the stack. The surfaces of the plates typically contain a "flow field," which is a set of channels machined or stamped into the plate to allow gases to flow over the MEA. The flow fields supply fluid (fuel or oxidant) and remove water produced as a reaction product of the fuel cell. A popular channel configuration for fuel cells is serpentine.

The conventional MEA is comprised of, for example, a polymer membrane, catalyst layers (anode and cathode), and diffusion media. The membrane blocks electrons but permits positively charged ions to pass between the anode and cathode. A layer of catalyst is added on both sides of the membrane. The MEA is sandwiched between the membrane and gas diffusion layers (GDLs). The GDLs are, for example, thin, porous sheets that provide relatively high electrical and thermal conductivity and chemical/corrosion resistance. In addition, the GDLs facilitate transport of reactants into the catalyst layer, as well as removal of product water. Gases diffuse rapidly through the pores in the GDLs. Gaskets provide a seal around the MEA to help prevent leaks between the MEA and the flow field plates.

Conventional DEFCs have several shortcomings, including slow electrode kinetics at the anode due to the strong bond between carbons, ethanol crossing over through the polymer membrane, and the formation of intermediate products and cathode poisoning. In addition, conventional DEFCs suffer from engineering problems, such as leakage and complicated assembly with many components.

SUMMARY

Aspects of the present disclosure provide a comprehensive approach to fuel cells using a corrugated electrode structure, which optimally distributes catalyst. Here, an optimal distribution means a gradient distribution of catalyst minimizes the catalyst loading without any scarification of cell performance. The corrugated catalyst support is fabricated by electro-spun nanofibers, for example, which provide better percolation and high reaction sites. Catalyst will be loaded onto the electro-spun nanofiber support. For engineering problems, a novel design based on a pocket structure includes the whole system into a container, which can effectively prevent leakage and minimize the necessary components.

In an aspect, a corrugated fuel cell membrane electrode assembly (MEA) structure is assembled within a pocket structure. The corrugated structures offer higher surface area and increase the reaction site with the same projected area. The stacked structure also eliminates the need for gaskets to prevent leakage and permits a simplified geometry.

In an aspect, an MEA comprises an anode electrode, a cathode electrode, and a membrane. The membrane, which is positioned between the anode electrode and the cathode electrode, is configured to form an interface between the electrodes. The anode electrode and the cathode electrode each have a corrugated shape.

In another aspect, an electrochemical reaction cell comprises an anode electrode and a cathode electrode each having a corrugated shape and configured to supply electric current to an external circuit during operation of the fuel cell. A housing, which has a recess formed in an inner surface of the housing, receives the anode electrode and the cathode electrode. The reaction cell also has an electrolyte fluid contained within the housing and in contact with the anode electrode and the cathode electrode.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
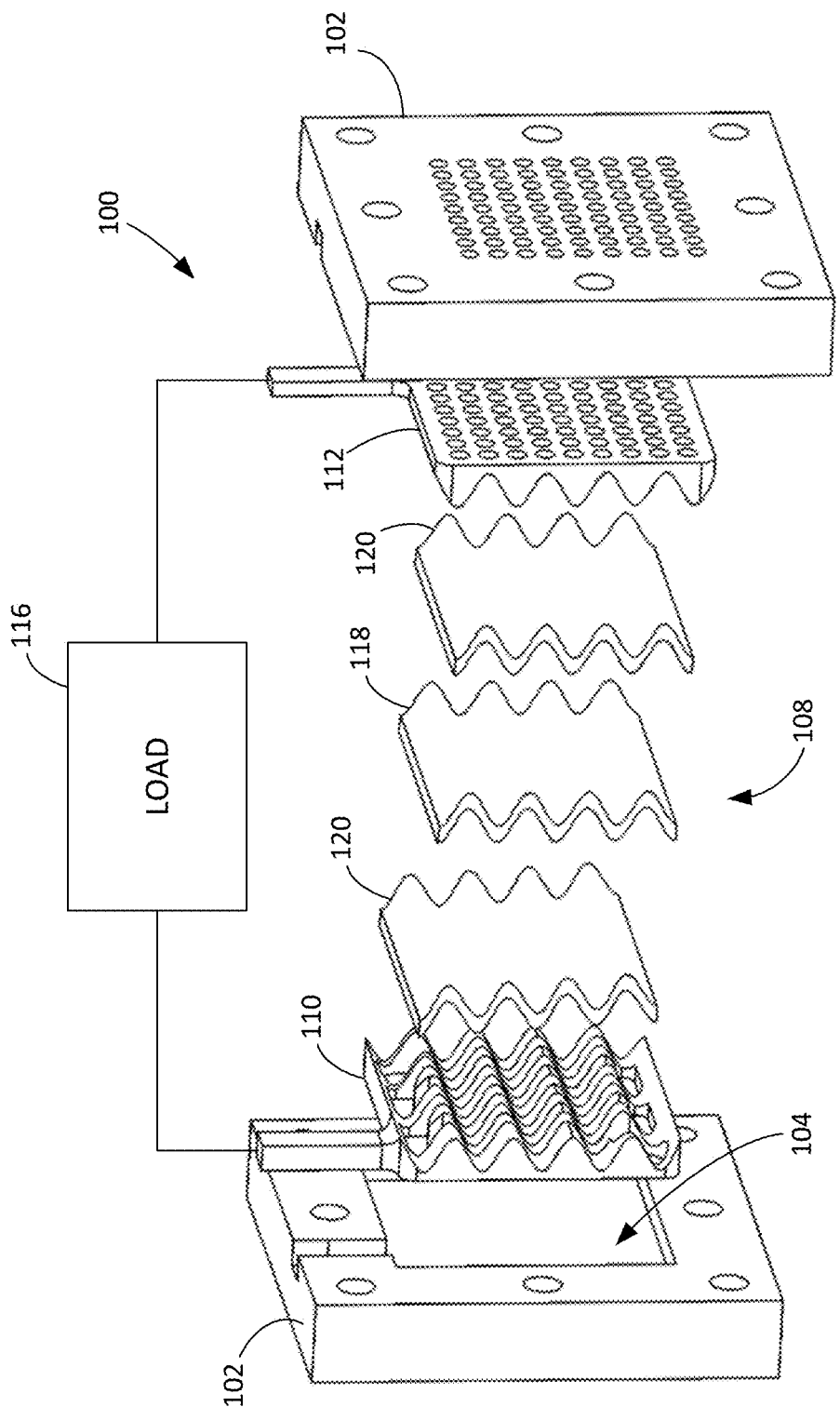
FIG. 1 is an exploded schematic diagram of a direct ethanol fuel cell (DEFC) according to an embodiment.

FIG. 1 illustrates a direct ethanol fuel cell (DEFC) 100 embodying aspects of the present disclosure. The DEFC 100 includes first and second housing sections, or end plates 102, assembled together via a plurality of mechanical fasteners, such as bolts. A portion of an inner surface of each end plate 102 is recessed to form a pocket 104 in which the components of the DEFC 100 are housed. In this manner, the pockets 104, or recesses, in the end plates 102 obviate the need for gaskets. In contrast, the conventional stacked structure requires many gaskets to prevent leakage. To solve the engineering problems, end plates 102 comprise a pocket structure that contains the whole system and that effectively prevents leakage while minimizing the number of components.

Referring further to FIG. 1, the DEFC 100 includes a corrugated fuel cell MEA structure 108 housed in the pocket 104 formed in the end plates 102. The corrugated MEA 108 includes an anode channel 110 and a cathode channel 112 across which an electrical load 116 may be connected. According to aspect of the present disclosure, the anode and cathode channels 110, 112 each have a matching corrugated shape. The MEA 108 further includes a nanofiber membrane 118 sandwiched between gas diffusion layers (GDLs) 120. Similarly, the membrane 118 and the GDLs 120 when installed in MEA 108 also have a matching corrugated shape. The corrugated MEA structure 108 offers higher surface area (e.g., the demonstrated structure has 30% greater surface area than the conventional structure). The corrugated MEA structure 108 also increases the reaction site with the same projected area. Also, the present design improves upon the complicated geometry of conventional fuel cells in which the MEA is sandwiched between flat end plates thus limiting space utilization. The present embedded architecture solves each of these problems simultaneously.

Figure 2:
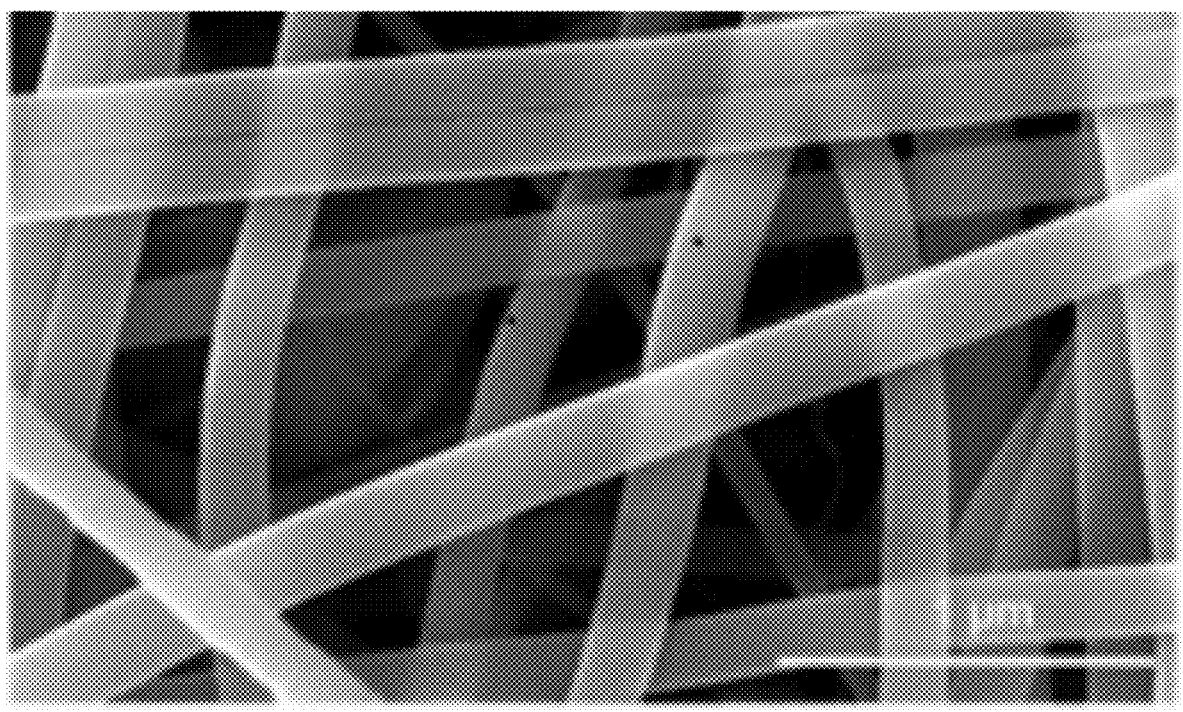
FIG. 2 illustrates exemplary electro-spun nanofibers for use in a catalyst support structure of the DEFC of FIG. 1.

FIG. 2 illustrates an example of membrane 118 comprising an electro-spun fiber mat catalyst support. Conventional catalyst supports are based on casting or spray processes. In an embodiment according to the present disclosure, a novel nanofiber based architecture as shown in FIG. 2 is used, which results in an excellent catalyst/binder mixing and forms a more porous morphology. A comprehensive approach uses a corrugated electrode structure, which optimally distributes a catalyst, such as a nanoparticle catalyst (e.g., nanometer-sized particles of platinum, dispersed on a high-surface-area carbon support). Here, an optimal distribution means a gradient distribution of catalyst minimizes the catalyst loading without any scarification of cell performance. In an embodiment, the corrugated catalyst support, i.e., membrane 118, is fabricated of electro-spun nanofibers, which provide better percolation and high reaction sites. Catalyst is loaded onto the electro-spun nanofiber support in this embodiment. The nanofiber based architecture allows a higher current operation. Further, by adjusting the ratio of catalyst during the preparation of solution, a catalyst gradient structure can be formed, which optimizes the catalyst loading depending on the position.

Figure 3:
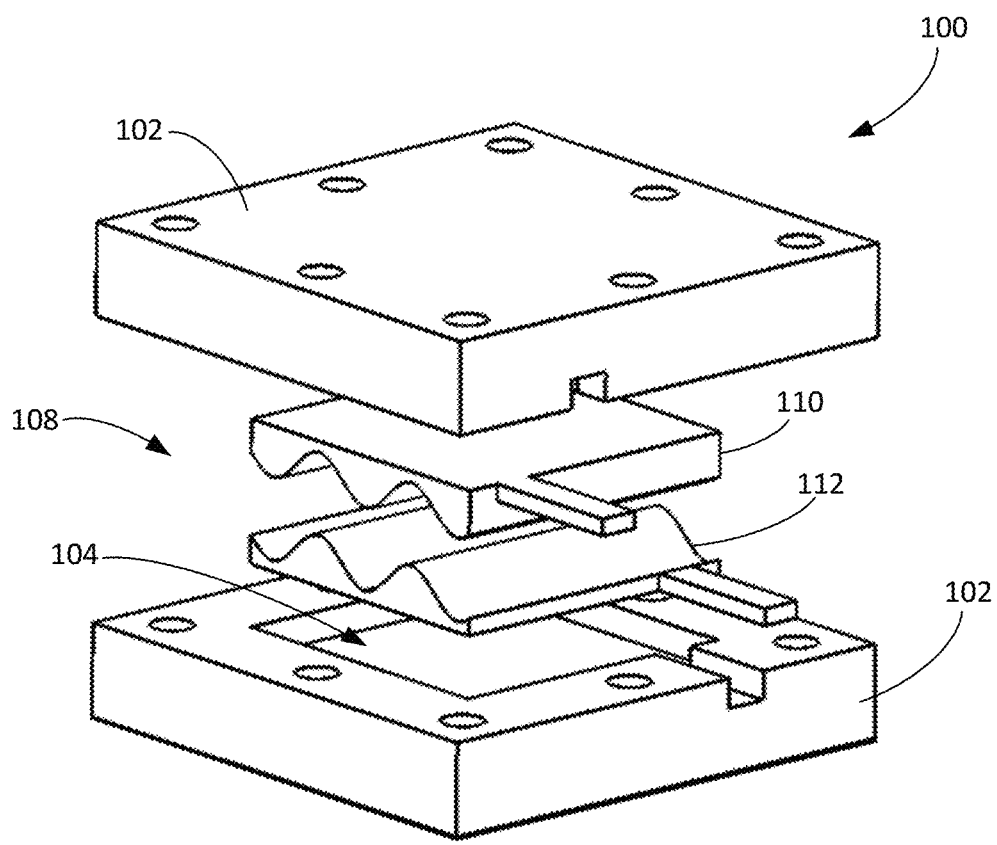
FIGS. 3-5 illustrate examples of corrugated anode and cathode channels of the DEFC of FIG. 1.
Figure 4:
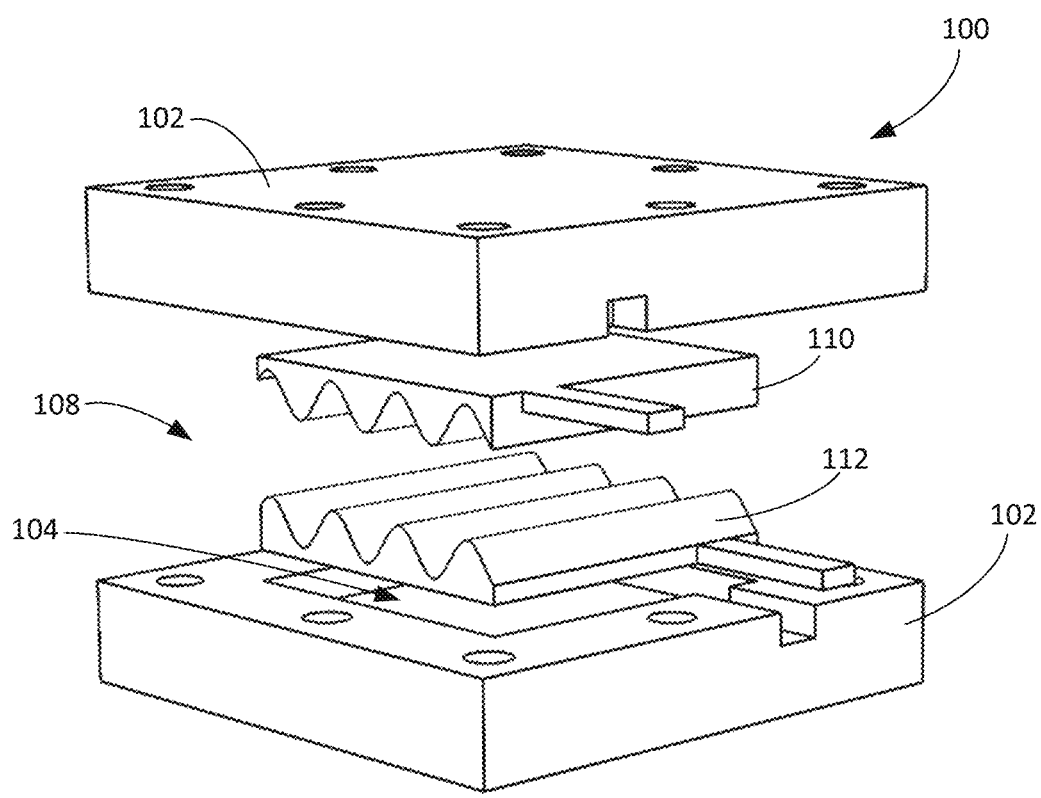
Figure 5:
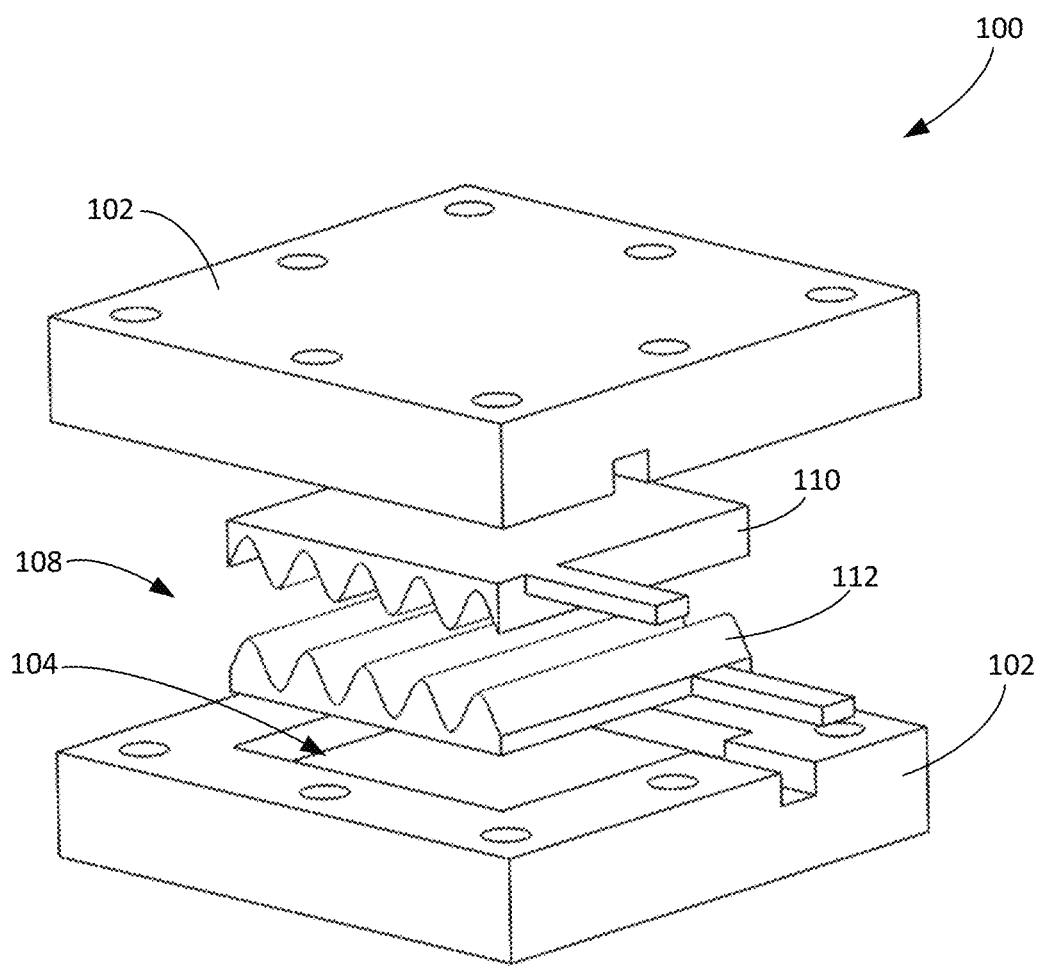
Figure 6:
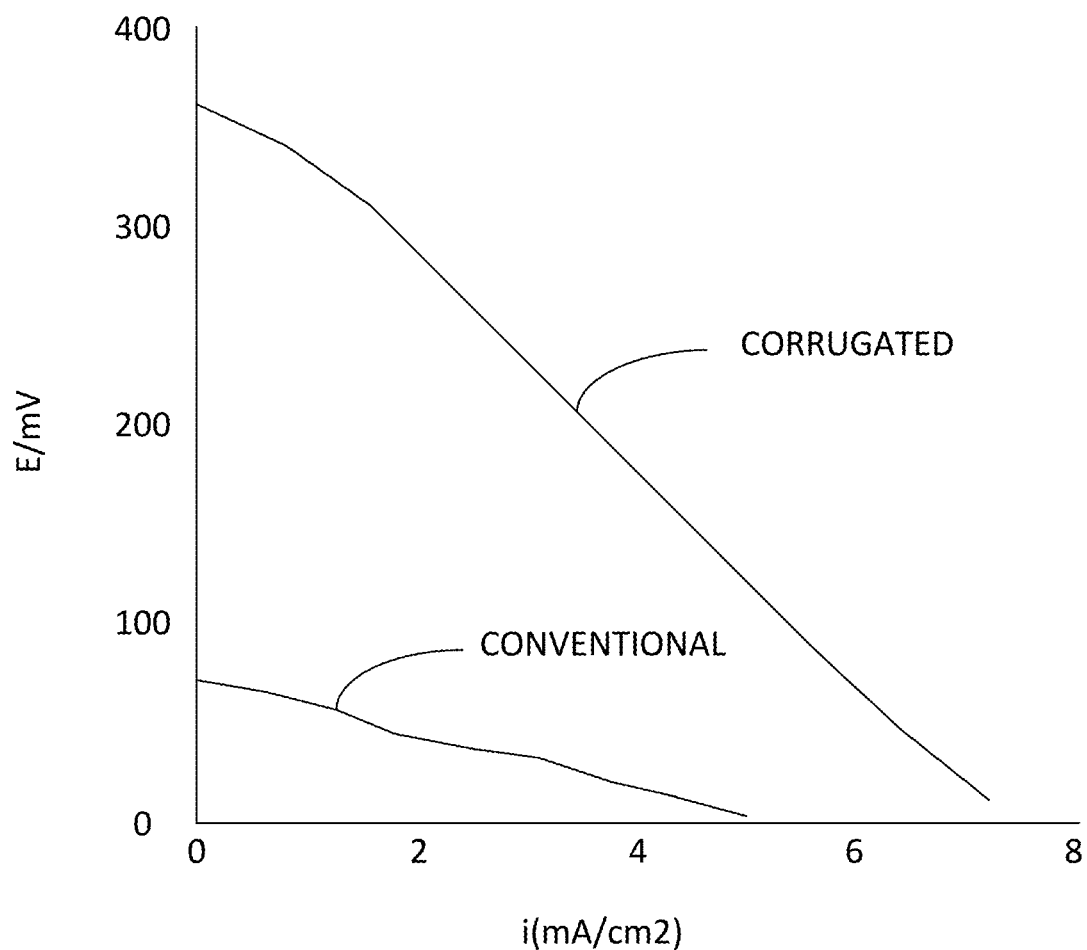
FIG. 6 illustrates cell performance comparison of the DEFC of FIG. 1 compared to a conventional DEFC.

As described above, a conventional MEA is a flat structure. FIGS. 3-5 illustrate examples of corrugated MEA structures 108. For simplicity, all of the structures of MEA 108 are not illustrated. In FIG. 3, anode 110 and cathode 112 of MEA 108 have, for example, two sine waves per inch. In FIG. 4, anode 110 and cathode 112 of MEA 108 have for example, three sine waves per inch. In FIG. 5, anode 110 and cathode 112 of MEA 108 have, for example, four sine waves per inch. The corrugated structures embodying aspects of the present disclosure offer higher surface area (demonstrated structure shows 30% higher area than the conventional structure). The corrugated structure increases the reaction site with the same projected area. FIG. 6 shows a cell performance comparison of preliminary results with the conventional flat structure compared to the corrugated structure of FIG. 1, with Palladium on Carbon (Pd/C) catalyst. As shown, the power performance increases significantly by using a corrugated assembly.

Aspects of the present disclosure address the most critical issues of DEFCs, which are the catalyst and its integration into cells. By leveraging these aspects, the challenges related to membrane 118, such as the use of nanofibers, can be examined. Also, by utilizing the embedded pocket structure, DEFCs embodying aspects of the present disclosure can be structurally integrated into vehicles, building structures, battle gear, etc. Because the size and weight of conventional fuel cell stacks is problematic for integration, aspects of the present disclosure provide greater availability in more applications. For instance, in Unmanned Aerial Vehicle (UAV) applications, fuel cell stack size and weight is critical to the overall aircraft weight, sizing, design, and performance. In order to help minimize the impact of the stack's size/weight restrictions, structural integration of fuel cells embodying aspects of the present disclosure is useful.

Table I provides a comparison of surface area of current collectors having corrugations:

TABLE I

| Corrugation | Surface Area (inch$^2$) | Weight (grams) | Volume (inch$^3$) |
| --- | --- | --- | --- |
| None | 1.3924 | 86.569 | 2.601 |
| 2 sine waves per inch | 1.6533 | 87.842 | 2.610 |
| 3 sine waves per inch | 1.9378 | 87.843 | 2.610 |
| 4 sine waves per inch | 2.28 | 87.846 | 2.610 |

In contrast to a reaction cell embodying aspects of the present disclosure, a conventional cell of approximately the same size having noncorrugated current collectors has significantly less surface area.

Although described in the context of a DEFC, it is to be understood that aspects of the present invention are applicable to other types of fuel cells and to reaction cells generally.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A membrane electrode assembly (MEA) comprising:
an anode channel;
a cathode channel; and
a membrane positioned between the anode channel and the cathode channel and configured to form an interface therebetween,
wherein each of the anode channel and the cathode channel comprises a rigid plate formed into a corrugated shape, the corrugated shape comprising alternating smooth peaks and valleys,
wherein the anode channel, the membrane, and the cathode channel are configured to engage with each other in a mating relationship in which peaks and valleys of the anode channel match with corresponding peaks and valleys of the cathode channel such that the membrane conforms to the corrugated shape when engaged between the anode channel and the cathode channel, and
wherein the anode channel, the membrane, and the cathode channel are configured to be received within a recess formed in an inner surface of a housing.

2. The MEA of claim 1, wherein the alternating peaks and valleys of the corrugated shape correspond to two or more sine waves per inch.

3. The MEA of claim 1, further comprising a pair of gas diffusion layers, wherein the anode channel, the cathode channel, and the membrane are positioned between the gas diffusion layers.

4. The MEA of claim 1, wherein the membrane comprises electro-spun nanofibers.

5. The MEA of claim 4, wherein the electro-spun nanofibers of the membrane have a catalyst loaded thereon.

6. The MEA of claim 1, wherein the anode channel comprises a flow channel plate having a flow channel distributed throughout in a serpentine configuration.

7. The MEA of claim 1, wherein the anode channel and the cathode channel each comprises a corresponding a current collector configured for providing electrical current to an electrical load.

8. An electrochemical reaction cell comprising:
an anode channel and a cathode channel each having a corrugated shape and configured to supply electric current to an external circuit during operation of the electrochemical reaction cell, wherein each of the anode channel and the cathode channel comprises a rigid plate formed into the corrugated shape, the corrugated shape comprising alternating smooth peaks and valleys, and wherein the peaks and valleys of the anode channel match with corresponding peaks and valleys of the cathode channel in a mating relationship;
a membrane positioned between the anode channel and the cathode channel and configured to form an interface therebetween, wherein the membrane conforms to the corrugated shape when engaged between the anode channel and the cathode channel in the mating relationship;
a housing having a recess formed in an inner surface thereof, the recess receiving the anode channel, the membrane, and the cathode channel therein; and
an electrolyte fluid contained within the housing and in contact with the anode channel and the cathode channel.

9. The electrochemical reaction cell of claim 8, wherein the alternating peaks and valleys of the corrugated shape correspond to two or more sine waves per inch.

10. The electrochemical reaction cell of claim 8, wherein the housing comprises two mating endplates assembled together.

11. The electrochemical reaction cell of claim 10, wherein each of the endplates has a recess therein and includes a plurality of recess walls defining an area of the recess, the recess walls configured to contain the electrolyte fluid.

12. The electrochemical reaction cell of claim 8, further comprising a pair of gas diffusion layers, wherein the anode channel, the cathode channel, and the membrane are positioned between the gas diffusion layers.

13. The electrochemical reaction cell of claim 8, wherein the membrane comprises electro-spun nanofibers.

14. The electrochemical reaction cell of claim 13, wherein the electro-spun nanofibers of the membrane have a catalyst loaded thereon.

15. The electrochemical reaction cell of claim 8, wherein the anode channel comprises a flow channel plate having a flow channel distributed throughout in a serpentine configuration.

16. The electrochemical reaction cell of claim 8, wherein the anode channel and the cathode channel each comprises a corresponding a current collector configured for providing electrical current generated in the reaction cell to an electrical load.

* * * * *